United States Patent
Shida et al.

(10) Patent No.: US 12,182,229 B2
(45) Date of Patent: Dec. 31, 2024

(54) SYSTEM AND METHOD FOR IDENTIFYING OWNERSHIP AND MANAGING TRANSFER OF OWNERSHIP OF PREMIUM GOODS

(71) Applicants: Daisuke Shida, Minato-ku (JP); Takamasa Sasaki, Minato-ku (JP)

(72) Inventors: Daisuke Shida, Minato-ku (JP); Takamasa Sasaki, Minato-ku (JP)

(*) Notice: Subject to any disclaimer, the term of this patent is extended or adjusted under 35 U.S.C. 154(b) by 416 days.

(21) Appl. No.: 17/850,666

(22) Filed: Jun. 27, 2022

(65) Prior Publication Data

US 2023/0161847 A1    May 25, 2023

Related U.S. Application Data

(60) Provisional application No. 63/281,530, filed on Nov. 19, 2021.

(51) Int. Cl.
G06F 21/00    (2013.01)
G06F 21/10    (2013.01)
H04L 9/00     (2022.01)
H04L 9/32     (2006.01)

(52) U.S. Cl.
CPC ............ *G06F 21/10* (2013.01); *H04L 9/3236* (2013.01); *H04L 9/3263* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2021/0279695 A1* | 9/2021 | Rice | G06Q 20/12 |
| 2022/0294630 A1* | 9/2022 | Collen | H04L 9/3213 |
| 2022/0309491 A1* | 9/2022 | Shapiro | G06F 21/64 |
| 2022/0335440 A1* | 10/2022 | Brazao | G06F 16/9038 |
| 2023/0045071 A1* | 2/2023 | Kalaldeh | G06Q 30/018 |
| 2023/0073859 A1* | 3/2023 | Matthews | G06Q 30/0641 |
| 2023/0085677 A1* | 3/2023 | Copeland | G06F 21/64 705/66 |
| 2023/0129494 A1* | 4/2023 | Quigley | G06Q 20/123 705/65 |
| 2023/0145439 A1* | 5/2023 | Suk | H04L 63/0861 705/44 |
| 2023/0161847 A1* | 5/2023 | Shida | H04L 9/3263 726/26 |

(Continued)

*Primary Examiner* — Jeffery L Williams
(74) *Attorney, Agent, or Firm* — Barry Choobin; Patent 360

(57) ABSTRACT

An ownership management system records an article ID, which is unique information for identifying an article, and an owner ID, which is information indicating an owner of the article, on a blockchain in association with each other, and generates a two-dimensional code from a hash value acquired from the blockchain at the time of recording, the article ID, and the owner ID. The ownership management system accepts the two-dimensional code, extracts the hash value, the article ID, and the owner ID from the accepted two-dimensional code acquires the article ID and the owner ID recorded on the blockchain by using the extracted hash value, determines a matching relationship between the article ID and the owner ID extracted from the two-dimensional code, and outputs the extracted article ID and the owner ID when it is determined that the matching is made.

18 Claims, 11 Drawing Sheets

(56) References Cited

U.S. PATENT DOCUMENTS

| | | | |
|---|---|---|---|
| 2023/0196318 A1* | 6/2023 | Rosen | G06Q 20/3829 |
| | | | 705/71 |
| 2023/0230054 A1* | 7/2023 | Livesay | G06Q 20/02 |
| | | | 705/39 |
| 2023/0230069 A1* | 7/2023 | Voorhees | G06Q 20/065 |
| | | | 705/69 |
| 2023/0316261 A1* | 10/2023 | Agbamu | G06N 3/09 |
| | | | 705/67 |
| 2023/0327866 A1* | 10/2023 | Andon | G06Q 30/0609 |
| | | | 380/44 |
| 2023/0351347 A1* | 11/2023 | Damrow | G06Q 20/36 |
| 2023/0419315 A1* | 12/2023 | Togame | G06Q 30/06 |
| 2024/0100444 A1* | 3/2024 | Samarthyam | G06Q 10/1053 |
| 2024/0193621 A1* | 6/2024 | Shapshal | G07D 7/0034 |
| 2024/0242287 A1* | 7/2024 | Rice | G06Q 20/308 |
| 2024/0249628 A1* | 7/2024 | DiCosola | G06Q 20/20 |

* cited by examiner

SYSTEM AND METHOD FOR IDENTIFYING OWNERSHIP AND MANAGING TRANSFER OF OWNERSHIP OF PREMIUM GOODS

CROSS-REFERENCE TO RELATED APPLICATIONS

This application claims priority from the U.S. provisional patent application Ser. No. 63/281,530, filed on Nov. 19, 2021, which is incorporated herein by reference in its entirety.

FIELD OF INVENTION

The present invention relates to a system and method for identifying ownership of premium goods and managing the transfer of the ownership, and more particularly, the present invention relates to a system and method for managing ownership of premium goods based on identification codes, non-fungible tokens, and blockchain technology.

BACKGROUND

Digital data, such as digital artworks and digital items acquired in digital games, are referred to as digital assets. The digital assets have economical value in themselves and can be traded like industrial goods. However, piracy and duplicity are major problems in the sales of digital assets. The digital assets can be easily duplicated, and fraudulent transfer acts that pretend to be an owner are common. In order to address this issue, approaches have been made to manage digital assets with a non-fungible token (NFT).

The NFT is a digital ledger stored in a blockchain that is non-interchangeable and permanently linked to artistic work. NFT can validate the authenticity and ownership of a piece of artwork and is generally considered a digital asset. NFT can be created for digital files such as text, images, video, and music, wherein the NFT is associated with only one digital file. The known methods for managing ownership using blockchain technology are for digital pieces of work only.

An industrial need is there for a system and method to manage the ownership and transfer of tangible goods, such as industrial goods, or more specifically premium tangible goods using blockchain technology.

The "tangible goods", "goods", and "articles", are interchangeably used hereinafter referring to goods that can be seen by eyes and perceived by touch, and more specifically refers to premium goods that have high value due to comparatively higher cost or limited availability.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The present invention has been made to solve the above and other problems, and an object of the present invention is to provide an ownership management system and an ownership management identification code that enable authentication and management of ownership of articles.

In order to solve the problems illustrated in the background, disclosed is an article ownership management system for articles. The system can include a recording unit to record the identification and ownership information of an article. The identification can be unique information for identifying the article and the ownership information can identify the owner of the article. The system can further include a generation unit configured to generate an ownership management identification code from a hash value acquired from the blockchain at the time of recording, the article identification information and the ownership information, an acceptance unit configured to accept the ownership management identification code, an extraction unit configured to extract the hash value, the article identification information, and the ownership information from the ownership management identification code accepted by the acceptance unit, a determination unit configured to acquire the article identification information and the ownership information recorded on the blockchain using the extracted hash value and determine a matching relationship between the article identification information and the ownership information extracted from the ownership management identification code, and an output unit configured to output the extracted article identification information and ownership information when it is determined by the determination unit that the matching is made.

When the owner of the article is changed, the recording unit that has received the changed ownership information may record the article identification information related to the article and the changed ownership information on the blockchain in association with each other, and the generation unit may generate the ownership management identification code from the hash value acquired from the blockchain at the time of recording, the article identification information, and the ownership information.

The ownership management system may further include a video data recording unit configured to store video data corresponding to an article related to the article identification information in a distributed file system in association with at least one of the hash value acquired from the blockchain at the time of recording and the article identification information, and record link data related to storage of the video data and the article identification information on the blockchain in association with each other, in which, when it is determined by the determination unit that the matching is made, the output unit outputs the video data corresponding to a product related to the article identification information in a viewable manner based on at least one of the hash value, and the article identification information extracted from the ownership management identification code by the extraction unit.

When it is determined by the determination unit that the matching is made, the output unit may output the extracted hash value together with the matching relationship.

The article ownership management system may further include a management unit configured to record and manage a history of determination for each article identification information when the determination unit performs the determination process.

In addition, another aspect of the present invention, there is provided an ownership management identification code used in an article ownership management system, in which the ownership management identification code is generated by coding a hash value acquired when article identification information, which is unique information for identifying at least an article, and ownership information, which is information indicating an owner of the article, are recorded on a blockchain in association with each other, the article identification information, and the ownership information.

In one aspect disclosed is a method for managing ownership of an article and transfer of the ownership of the article, the method implemented within a system comprising a processor and a memory, the method comprising the steps of receiving a request to register an article from a first owner of the article from a terminal device; assigning a unique articleID to the article and a unique first ownerID to the first owner; generating a record comprising the articleID and the first ownerID; processing the record as a first block in a blockchain database; generating a first certificate comprising a hash value of the first block, the articleID, and the first ownerID; and presenting the first certificate on the terminal device.

In one implementation, the method further comprises the steps of providing an interface on the terminal device for capturing a video data of the article using a camera coupled to the terminal device; storing the video data on a file server, wherein the file server is configured to stream the video data; generating a distributed hash value of the video data, wherein the record further comprises the distributed hash value.

In one implementation, the method further comprises the steps of generating a link to the video data, wherein the link is configured to provide an access to the video data for streaming the video data.

In one implementation, the hash value of the first block is represented in a graphical form, wherein the hash value of the first block is readable from the graphical form. The method further comprises the steps of receiving an owner change request from the first owner through the terminal device, the owner change request comprises the hash value of the first block; assigning a second ownerID to a second owner of the article; generating a second record comprising the second ownerID and the articleID, wherein the second record is linked with the first record; receiving the hash value of the first block through an interface provided on the operation terminal and a camera coupled to the operation terminal; upon receiving the hash value of the first block from the operation terminal, verifying the first record based on the obtained hash value of the first block; and upon verification, storing the second record as a second block in the blockchain; presenting the second certificate, generated from the hash value of the second block, the second ownerID, and the articleID, on the terminal device.

In one implementation, the method further comprises the step of generating a non-fungible token based on the first block.

In one implementation, the method further comprises the steps of receiving login credentials of the second owner through the operation terminal, wherein the verification is further based on the login credentials of the second owner, wherein the second ownerID is associated with the login credentials of the second owner. The method further comprises a step of presenting a screen on the operation terminal, wherein the screen comprises the link to the video data. The graphical form is a barcode or a QR code.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
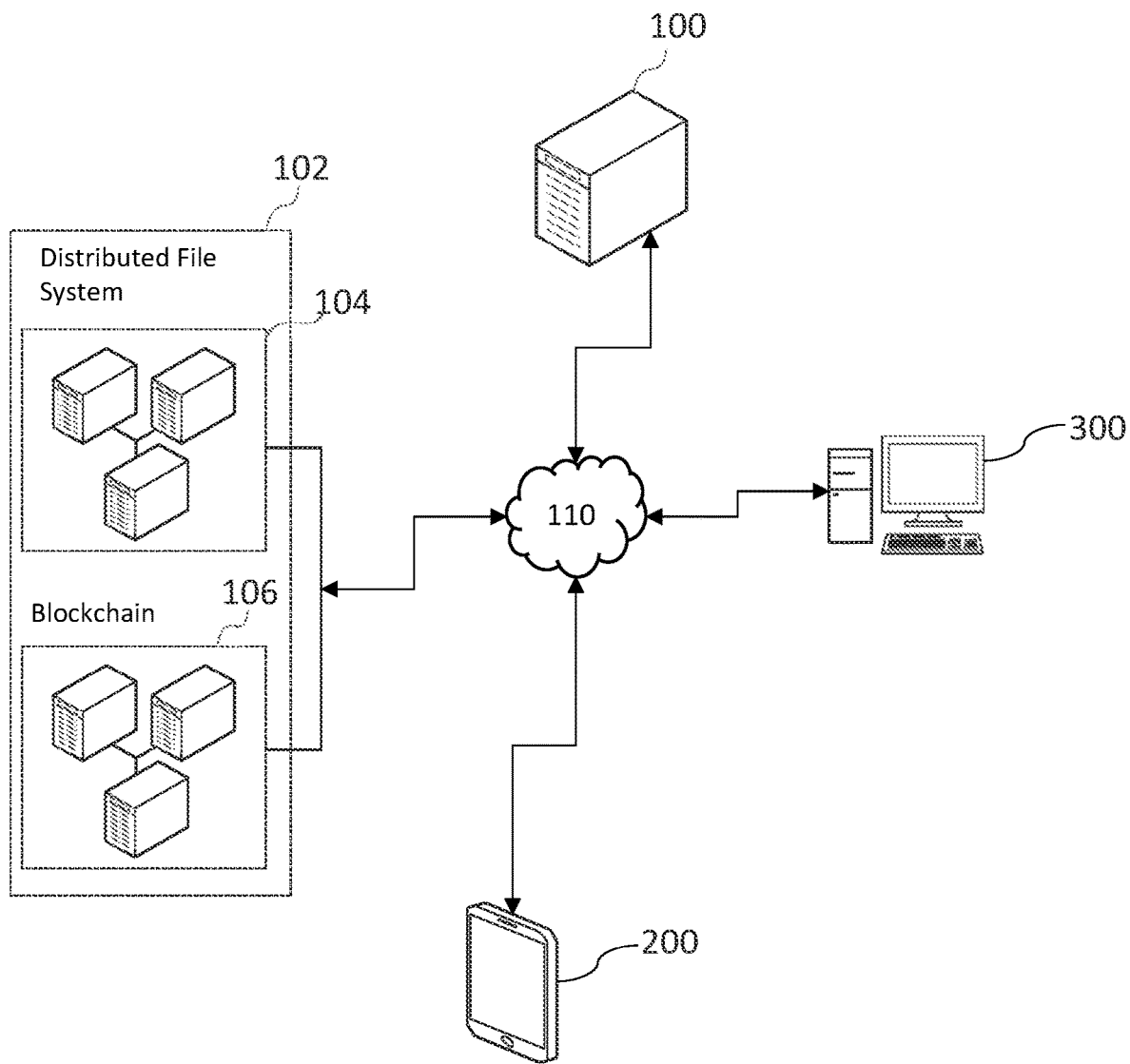
FIG. 1 is a block diagram illustrating an environment of the disclosed article ownership management system, according to an embodiment of the present invention.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent Disclosed is an article ownership management system that can be used to prove ownership of articles, and in particular, the ownership of premium articles. The disclosed article ownership management system can facilitate the transfer of an article while providing a safeguard against fake articles and fraudulent transactions. Referring to FIG. 1 which is a block diagram illustrating an environment of the disclosed system 100. The disclosed article ownership management system 100 aims to prevent fraudulent transactions, such as the fraudulent transactions by the impersonating owners of articles, and prevent fraudulent acts such as selling counterfeit products and making fraudulent profits. The disclosed system can generate NFTs associated with tangible articles by recording information that specifies the owners of the tangible articles associated with the NFTs. Although an article to be subjected to ownership management is not particularly limited, the article ownership management system 100 may be suitable for managing ownership of artworks such as print with a limited number of productions and, even industrial products, such as high value-added articles with a limited number of productions such as premium golf club. The users of the disclosed article ownership management system can be a manufacturer, a seller, a consumer (user), and the like. As will be described later, the disclosed article ownership management system can also provide an authenticity determination service for an article to be managed.

Referring to FIG. 1, the article ownership management system 100 can communicate with an operation terminal 200 of a user through a network 110. Network 110 can be a wireless network, a wired network, or a combination of the wired network and the wireless network. Examples of the network include a local area network (LAN), a wide area network (WAN), a cellular network including 2G, 3G, 4G, and 5G, Wi-Max, Wi-Fi, DSL, Fiber network, and the like. The wide area network includes the internet. The network can be a secured or unsecured network. The operation terminal 200 can be a computer device operated by a user for interacting with the disclosed system 100. The operation terminal 200 can be a laptop, desktop computer, smartphone, tablet computer, and the like. The operation terminal 200 can include at least a display to present information to the user. The operation terminal 200 can also include an input device for receiving input from the user, such as a touch screen. Operation terminal 200 can also include a camera for capturing an image within the field of view of the camera and a network circuitry for connecting to network 110. The operation terminal 200 can also include suitable software to read a Bar Code or similar graphical representation of information. While FIG. 1 shows a single operation terminal 200, it is understood, however, that more than one operation terminal 200 can simultaneously connect with the disclosed system, or several operation terminals 200 can be connected to the disclosed system at different times. Moreover, while FIG. 1 shows a single network 110 connecting the disclosed system 100 and different devices is for illustration only, it is understood that different devices can connect with the disclosed system through different networks and a single device can connect with the disclosed system through one or more networks, such as a combination of the wired and wireless network.

The disclosed system 100 can also connect with a terminal device 300 of a producer or a manufacturer of an article, wherein the terminal device 300 can be connected through the network 110. The terminal device 300 can be a computer device, such as a personal computer, smartphone, laptop, workstation, and the like. The disclosed system 100 can receive a generation request and an ownership management request of an NFT from a terminal device 300.

Also, the disclosed system 100 can be connected to file server 102 for storing data, the file server 102 can include a distributed file system server/database 104 and a blockchain server/database 106. In one implementation, the blockchain server can generate a blockchain block of the platform Ethereum and is also a node as the distributed server constituting the distributed file system. In the present embodiment, Ethereum which is a blockchain platform is an issuance subject of the NFT, but other blockchain platforms can be used, and any distributed file system or blockchain platform can be used without departing from the scope of the present invention. Note that the computer group 108 can also be used as a storage location for video data to be described later. Therefore, the distributed file system may be used as long as it can acquire files using some kind of link data that makes it possible to distribute and store video data and to associate and acquire files that are stored in a distributed manner and are not particularly limited to the IPFS.

The disclosed article ownership management system 100 can be implemented in a server environment including cloud servers, wherein one or more servers are within the scope of the present invention. Also, more than one server can be at one location or geographically dispersed in several locations.

Figure 2:
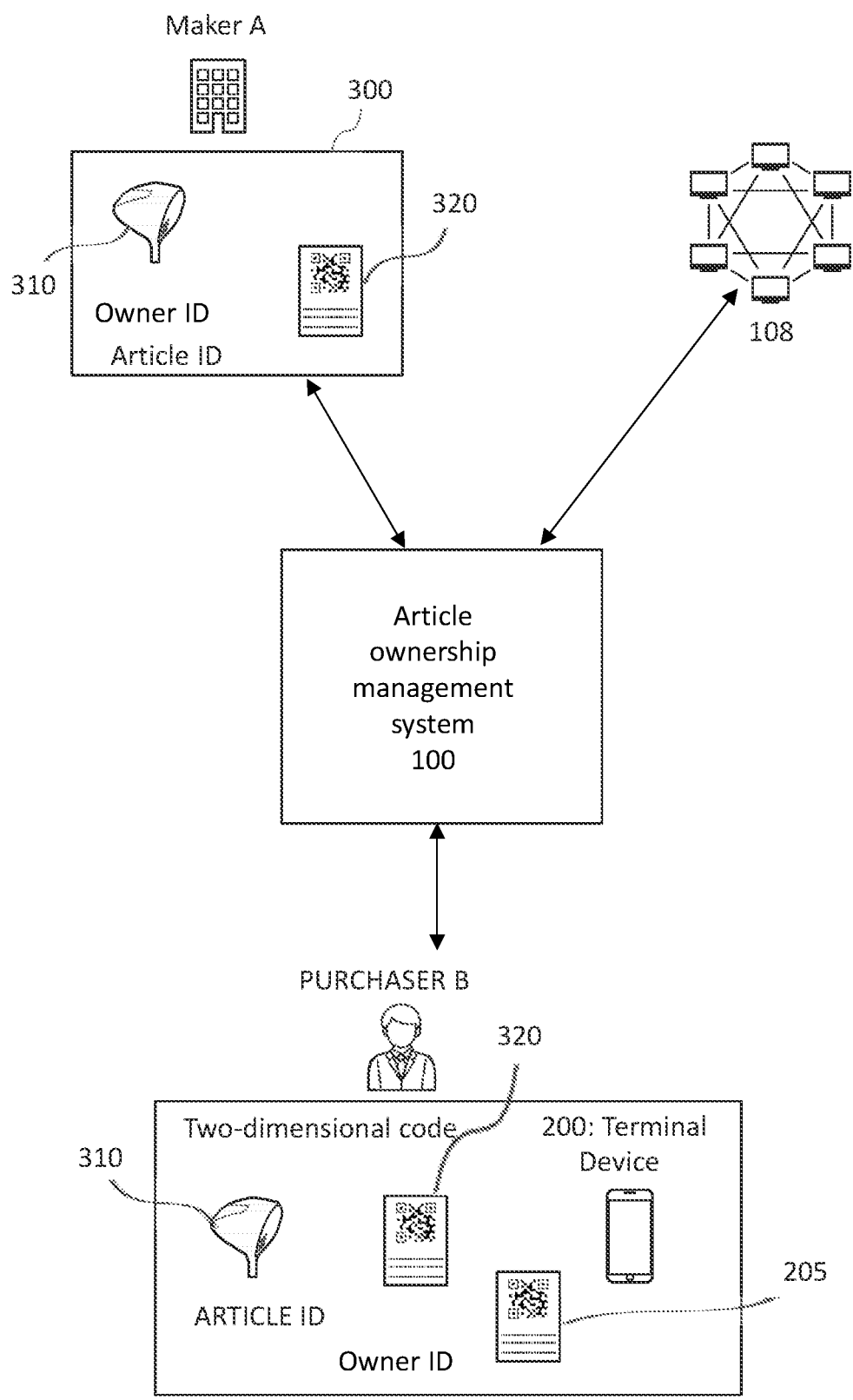
FIG. 2 is a diagram illustrating a flow of article ownership transfer, according to an embodiment of the present invention.

Referring to FIG. 2 which is a block diagram to illustrate a flow of selling an article by a certain manufacturer/producer who manufactured/produced the article and transferring ownership of the article to a purchaser. FIG. 2 schematically illustrates certain aspects of ownership management in the disclosed article ownership management system 100. In FIG. 2, is shown a golf club 310 as the article that is manufactured by a manufacturer "Maker A" and given an article ID "A11111" by the manufacturer or any concerned person or authority. Maker A intends to realize the ownership management of article 310 by the disclosed article ownership management system 100. At first, maker A, through the terminal device 300, can request the article ownership management system 100 to generate an NFT of article 310 and manage ownership of article 310. This ownership management includes an authenticity determination service by the management company. In this case, the maker A can transmit, to the article ownership management system 100, an article ID which can be a unique ID allocated to the article 310 at the time of manufacturing the article 310 or any time later after manufacturing, an owner ID as owner information allocated to the maker A, and video data which can be accessed and reproduced only by an authentic owner of the article 310. Text data including information regarding the article 310, such as a maker name, a product name, and a manufacturing number can be attached to the article ID.

Furthermore, when the article 310 is an article protected by copyright property, such as an artwork, the text data may include details of the copyright. Similarly, information about patents, tradename, registered mark, and the like can also be appended.

When using the present article ownership management system 100, the maker A may register with the disclosed article ownership management system 100 by providing certain user information (name, address, or the like) and receive a user ID and a password corresponding to the user ID.

On the basis of the request from the terminal device 300, the disclosed article ownership management system 100 can record the information including the article ID of the article 310 and the ownership ID of the owner of the article 310 on the blockchain server. The owner ID or information can be a unique identification code of the owner, the owner ID can be generated by the disclosed article ownership management system 100, for example, at the time of registration. The owner ID can also be obtained from any other source, provided that the source may be recognized by the disclosed article ownership management system 100. Thus, the owner ID can be a unique code, such as an alphanumeric code, which can be used to identify an owner of an article.

Upon receiving the request to register a new article, the computer group 108 can generate an NFT based on the record on the blockchain i.e., the record of the article ID and associated owner ID, and other information appended with the owner ID, and issues the NFT to the disclosed system 100. While FIG. 2 shows a separate computer group 108 that issues the NFT, it is to be understood that the computer group 108 can be separate or a part of the disclosed article ownership management system 100. Thus, the NFTs can also be issued by the disclosed article ownership management system 100 without departing from the scope of the present invention. For each article, a record can be created that can include information including the owner ID and Article ID, wherein the record can be saved as a block in the blockchain, and a hash value of the respective block of the blockchain can be incorporated in the respective NFT. The NFT can also include other information related to the article, such as the article ID and the owner ID.

The NFT in the present embodiment includes at least a hash value (hereinafter referred to as a "blockchain hash value") issued by the blockchain when information regarding the article and the owner is recorded on the blockchain, the article ID of the article 310, and an owner ID regarding the maker A. By this NFT, the article 310 can be specified by the article ID and the owner ID specifying the owner of the article 310 are recorded on the blockchain in a form that cannot be falsified. In the disclosed article ownership management system 100, the ownership information regarding the article 310 is stored as a combination of the article ID, the owner ID associated with the article ID, and the blockchain hash value.

The disclosed article ownership management system 100 can transmit the certificate 320 including at least the article ID of the article 310 and the owner ID of the maker A to the terminal device 300. The certificate can include text data that can be visually read, and two-dimensional code to graphically represent the text. The two-dimensional graphical code can be a bar code, QR code, and the like scannable pattern that can be read by a suitable scanner or similar hardware. The hash value of the block can be represented graphically on the certificate.

The disclosed article ownership management system 100 can facilitate the transfer of ownership of the tangible articles. For illustration, the maker A sells the article 310 specified by the article ID "A11111" to a purchaser B. As a result, the article 310 identified by the article ID "A11111" is transferred from the maker A to the purchaser B. When selling the article 310 to the purchaser B, the maker A can request the disclosed article ownership management system 100 to perform a process for transferring the ownership of the article 310 from maker A to the purchaser B. Upon receiving the transfer request, a new owner ID for the purchaser B can be generated by the disclosed article ownership management system 100. The article ownership management system 100 can send an owner change request to the blockchain of the computer group 108 based on the request from the maker A. The disclosed computer group 108 can read the associated record on the blockchain using the information contained in the request and returns the record to the article ownership management system 100. It is understood that the computer group 108 can be separate from the Article ownership management system 100 or can be a part of the disclosed article ownership management system 100. The article ownership management system 100 stores the record after the change of the owner information accepted from the blockchain of the computer group 108 in a predetermined storage area. Now, the purchaser B can confirm that the ownership of the article A is definitely transferred from the maker A to the purchaser B by using the two-dimensional code on the certificate 320 obtained with the article 310. The two-dimensional code can be scanned using the operation terminal 200 and transmits the read two-dimensional code to the article ownership management system 100.

The Article ownership management system 100 based on the article ID and the owner ID received from the purchaser B by scanning the two-dimension code, generates a new certificate 205 including at least the article ID and the owner ID of the purchaser B. When using the present Article ownership management system 100, the purchaser B can also register and receive the setting of a user ID and a password corresponding to the user ID. The purchaser B can display the new certificate on operation terminal 200 to confirm the ownership of the article 310. In addition, the purchaser B reproduces the video data entrusted by maker A to the Article ownership management system 100 through this confirmation request, thereby realizing that the purchaser B is the owner of the article 310 and obtaining the sense of satisfaction of possession. It is understood that the purchaser B may not need to register with the disclosed article ownership management system 100 but an owner ID can be created by the Article ownership management system 100 for the purchaser B. Also, the purchaser B may already register with the disclosed Article ownership management system 100 and can already have an owner ID. In such a case, the former owner ID of the purchaser can be used by the Article ownership management system 100. In certain implementations, with the scanned code, the purchaser may also have to provide his owner ID. In case, the owner ID is generated by the disclosed article ownership management system 100, the same can be communicated by the maker A to the purchaser either with the QR code or separately. In certain implementations, only the producer or manufacturer can register the product with the disclosed article ownership management system 100, while the purchaser can resell the already registered product. However, to resell the article 310, the purchaser B, who is now a reseller, may have to register with the Article ownership management system 100 to initiate the transfer. The current owner of the article can have the right to access the video and can also share the video of the article. For example, the current owner, who can be a reseller of the article, can publish the video on the eCommerce platform, and the video can be proof of the authenticity of the respective article and authorization of the reseller to sell the article. Moreover, APIs can be used to automate certain aspects of the disclosed method, such as sending a transfer request by the seller, sending scanned data from a certificate by the purchaser for verification, and the like. The APIs can interact with the disclosed Article ownership management system 100 and based on the verification with the Article ownership management system 100, can certify the authenticity of the articles on the e-commerce platform.

Figure 3:
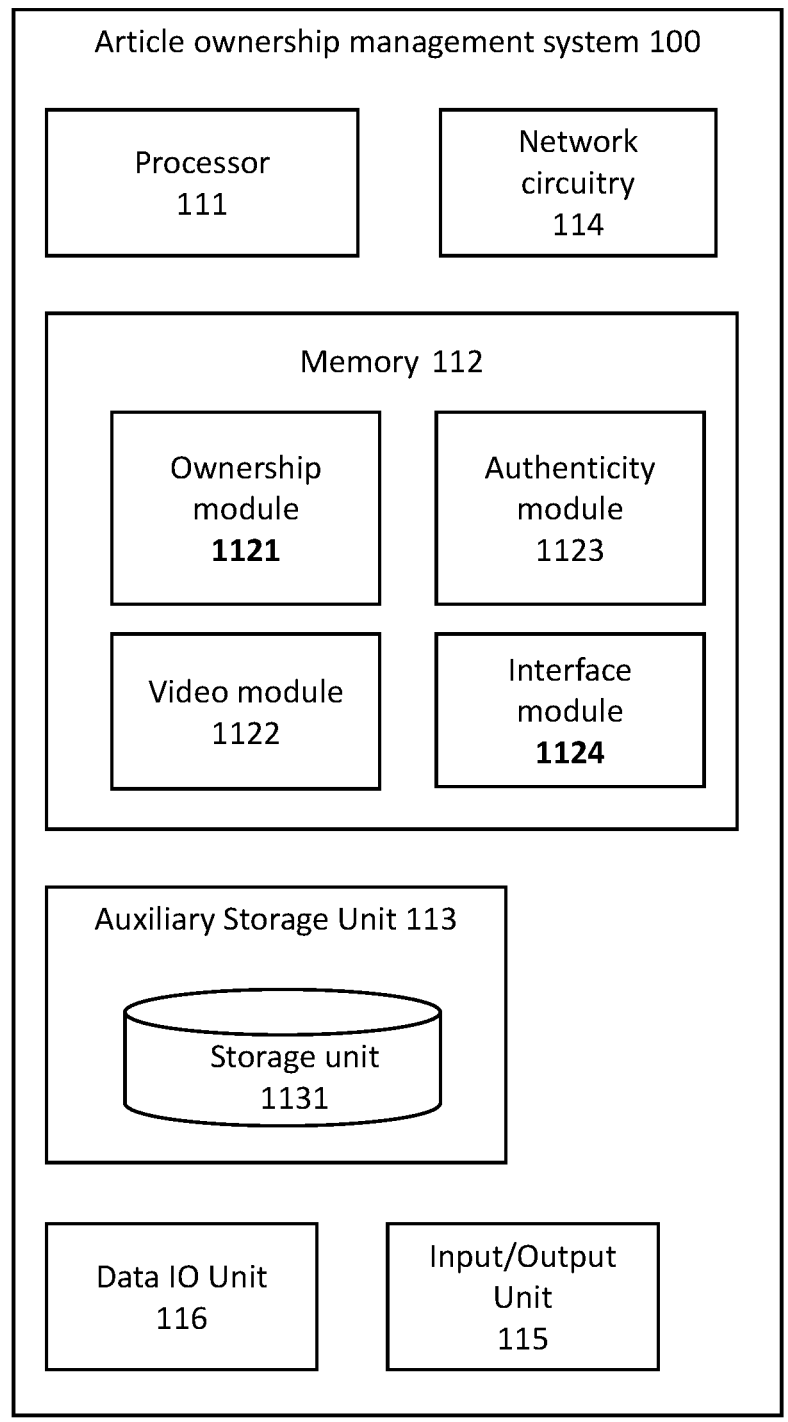
FIG. 3 is a block diagram of the article ownership management system, according to an embodiment of the present invention.

Referring to FIG. 3 which shows an architecture of the disclosed Article ownership management system 100. The disclosed system 100 can include a processor 111 and a memory 112. The processor can be any logic circuitry that responds to, and processes instructions fetched from the memory. The memory may include one or more memory chips capable of storing data and allowing any storage location to be directly accessed by the processor. The memory 112 can include a storage device such as a ROM, a RAM, or a flash memory, an auxiliary storage unit 113 including a storage device such as a semiconductor drive (SSD) or a hard disk drive (HDD). The disclosed article ownership management system 100 can also include a network circuitry 114 for connecting to an external network, an input/output unit 115 including an input device such as a keyboard, a touch panel, a pointing device, or a microphone, and an output device such as various displays or a speaker. The disclosed article ownership management system 100 can further include a data input/output (data IO) unit 116 for managing the data input/output of different components and modules.

The memory 112 can include an interface module 1124, an ownership module 1121, an authenticity module 1123, and a video module 1122. The interface module 1124 upon execution by the processor can provide an interface on the operation terminal 200 and terminal device 300, wherein the makers and the purchasers can interact with the disclosed system through the provided interface. The interface can be as application software that can be made available through a distribution service provider, for example, Google Play™ operated and developed by Google, and the app store by Apple™. In addition to the application software, a website-based interface can also be provided through the world-wide-web. The application software can also be provided for the desktop environment, such as Windows™, Linux, and macOS. Through the interface, a video of the article can be created, wherein the interface allows the user to capture the video using a camera of the user device (operation terminal or terminal device) and upload the video to the disclosed article ownership management system 100. Moreover, the interface may allow a user to scan a QR code using the camera attached to the operation terminal or a user device. Through the interface, a user can upload and download information from the article ownership management system 100. The ownership module 1121 which upon execution by the processor can provide for registering a new article and creation of NFT for the article. The video module 1122 upon execution by the processor can provide for the processing of the video data uploaded by the terminal device 300. The authenticity module 1123 upon execution by the processor can verify a transaction based on the NFT and owner ID of the purchaser. It is understood that the module herein refers to software, code, or a set of instructions that upon execution by the processor can perform one or more steps of the disclosed methodology.

The auxiliary storage unit 113 can be provided with an ownership information storage unit 1131. The ownership information storage unit 1131 can store ownership information on an article for which the ownership management is performed in accordance with the present invention.

The ownership information is, for example, a record including a combination of an article ID assigned to an article to be subjected to ownership management, an owner ID related to an owner of the article specified by the article ID, and a blockchain hash value issued when the article ID and the owner ID are recorded on a blockchain.

Figure 4:
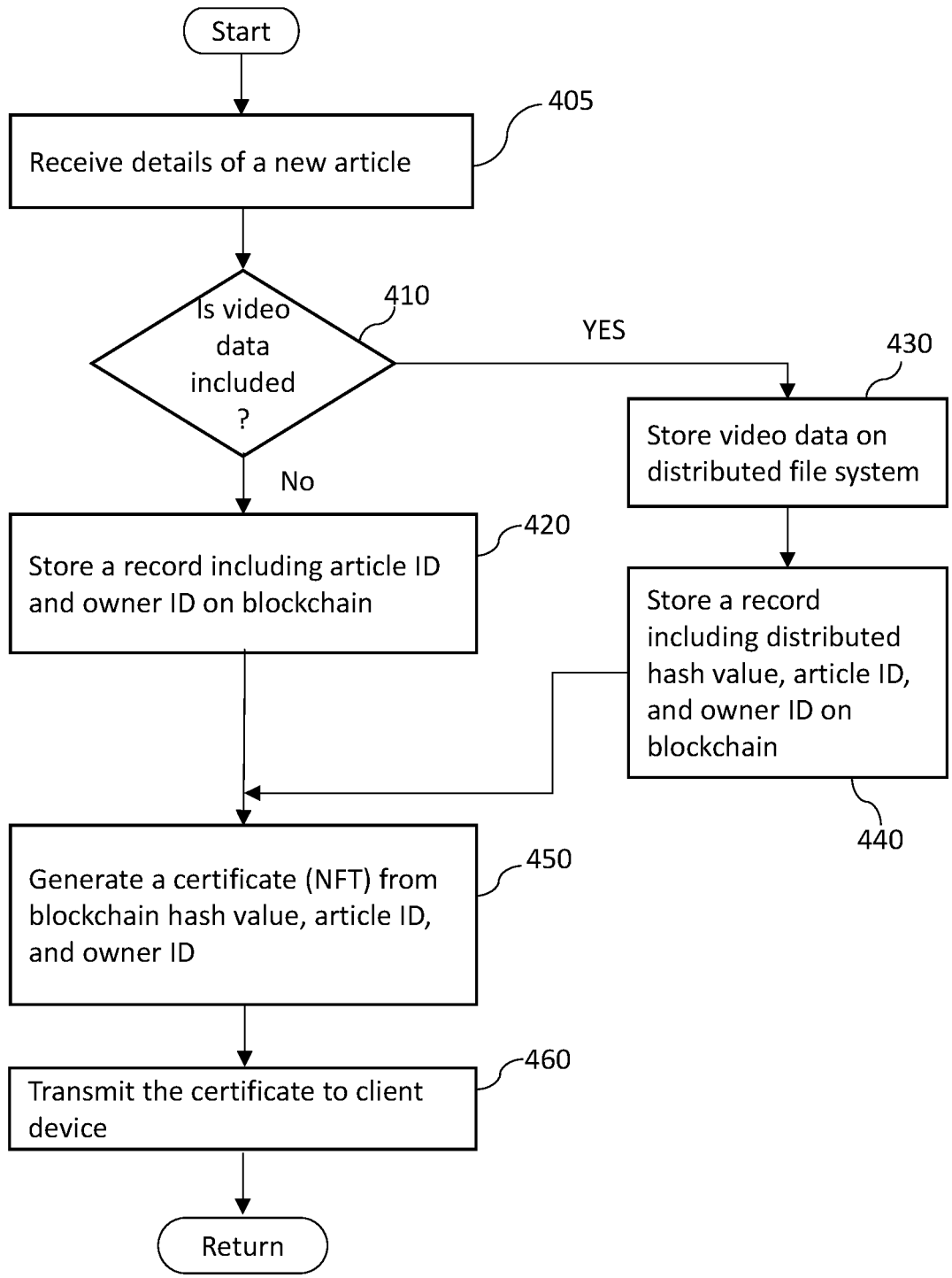
FIG. 4 is a flowchart illustrating the ownership module, according to an embodiment of the present invention.

Referring to FIG. 4 which is a flowchart illustrating an exemplary embodiment of the ownership module 1121. First, a manufacturer, producer, or user can provide details of an article they wish to register with the disclosed system for issuing an NFT and manage the ownership and transfer of the article through the terminal device 300, at step 410. At the time of the request, text data indicating an article ID which is a unique code assigned to the article, an owner ID of an entity who owns the article, and optionally video data related to the article can be received by the ownership module 1121 from the terminal device 300. The ownership module 1121 can also receive more information related to the article that can be appended to the article ID, however, the additional information may or may not form a part of the record and can be stored separately but linked to the record. The video data can be a video captured and generated using a storytelling method in which a producer or a manufacturer of an article introduces his/her thought and concept into the article like a story by interweaving secret stories during production and manufacturing. The video module can help generate the video data using an interface provided on the terminal device 300 and transmit the video data to the ownership module 1121. Note that, as described later, it is also possible to use the ownership management service without attaching the video data. The ownership module 1121 can receive various types of information including an article ID from the terminal device 300 of the user. The ownership module 1121 can check if video data has been received in the input from the terminal device 300, at check box 410. In case, the input includes the video data, the ownership module 1121 can store the video data on the distributed file system (computer group 108 in FIG. 1). The ownership module 1121 can also receive a "distributed hash value" for the stored video data from the distributed file system. The ownership module 1121 can then create a record for the article including the distributed hash value, the owner ID, and the article ID, and the record can be stored as a block in a blockchain server, at step 440. However, if video data is not included at step 410, the ownership module 1121 can create a record containing the owner ID and the article ID and record the same as a block in a blockchain server, at step 420. The ownership module 1121 can generate an NFT from a hash value of the block generated at step 420 or step 440, article ID, and the owner ID. The certificate corresponding to the NFT can then be transmitted by the ownership module 1121 to the terminal device 300, at step 460. It is understood that the data at different steps can be optionally encrypted. Also, the certificate can include the hash value of the block represented in a graphical form, such as a Bar code. Additional information can also be presented on the certificate in a readable graphic form or a test or a combination of both. Moreover, a new hash value can be created from the blockchain hash value, owner ID, and article ID, and the new hash value can be printed in the certificate in the form of a barcode or similar graphical representation. The certificate can be stored as an image file, PDF file, and any suitable format in the terminal device 300.

Figure 5:
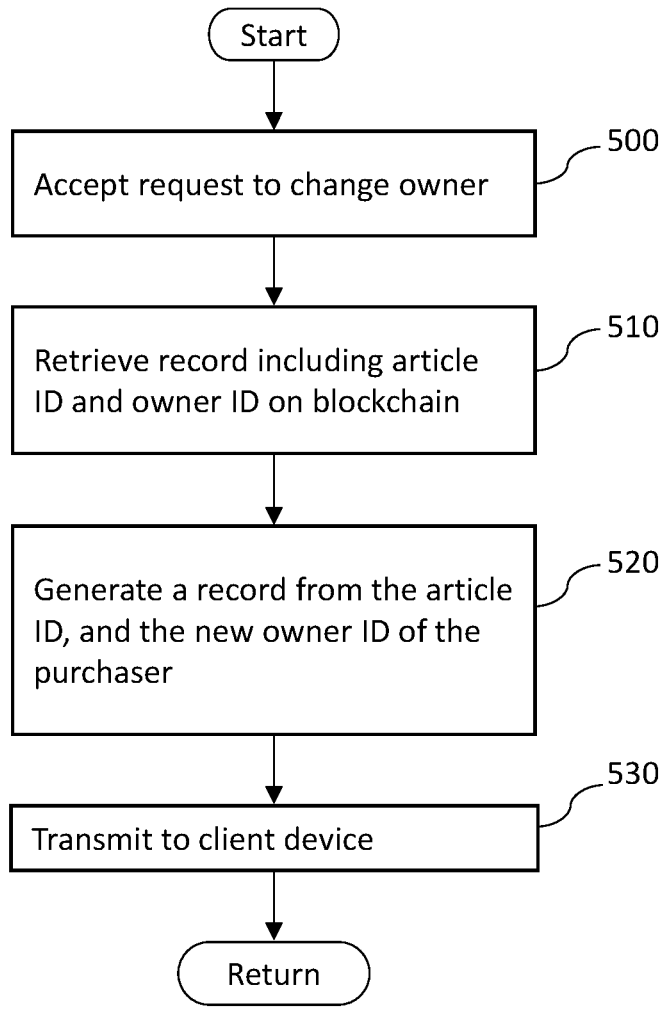
FIG. 5 is a flowchart illustrating another aspect of the ownership module, according to an embodiment of the present invention.

Referring to FIG. 5 which shows another implementation of the ownership module 1121 for changing the ownership of a registered article. The owner change process is data processing for recording the ownership transfer on the article ownership management system 100 when the ownership of the article subject to the ownership management target is transferred to another person due to the sales of the article or the like.

Now, the case where the ownership of the article is transferred from an article producer or manufacturer having the ownership of the article to a purchaser of the article is assumed. The ownership module 1121 can receive the owner change request transmitted from the terminal device 300 by the current owner of the article, at step 500. The owner change request includes the owner ID of the purchaser. In case, the owner ID of the purchaser is not available, the ownership module 1121 can generate the owner ID for the purchaser and the same can be communicated to the terminal device 300. However, when the purchaser already holds the owner ID issued from the article ownership management system 100, the owner ID of the purchaser is obtained and used as the owner ID of the purchaser. In a case where the purchaser does not hold the owner ID, the article ownership management system 100 that received the owner change request can generate a new owner ID of the purchaser. The ownership module 1121 can retrieve the record associated with the owner change request from the blockchain that includes at least the owner ID and the article ID, at step 510. The step may involve receiving scanned information from the certificate by the terminal device 300 for verification, or any other means of verification of the owner. The ownership module 1121 can generate a new record with the article ID the new owner ID of the purchaser, at step 520. The new record can be linked to the old record for tracking the transfer of the article and maintaining a history of the transactions. Thereafter, in step 530, the ownership module 1121 can transmit the receipt to the terminal device 300 acknowledging the transfer. In case, the owner ID of the purchaser is generated by the ownership module 1121, the receipt can also include the new owner ID.

According to the above owner change process, when the ownership is transferred due to the sale of an article or the like, the change in the owner ID associated with the transfer is recorded in a form that cannot be falsified on the blockchain. The producer/manufacturer who sells the article can provide the purchaser with a certificate that includes a QR code, in which the change of ownership of the article is recorded, that is attached to the article sold. For example, the certificate can be printed on the invoice. Alternatively, the certificate can be sent separately, in an electronic form or digital form. The same process of transfer can be observed when the article is sold by a reseller to a new purchaser.

Figure 6:
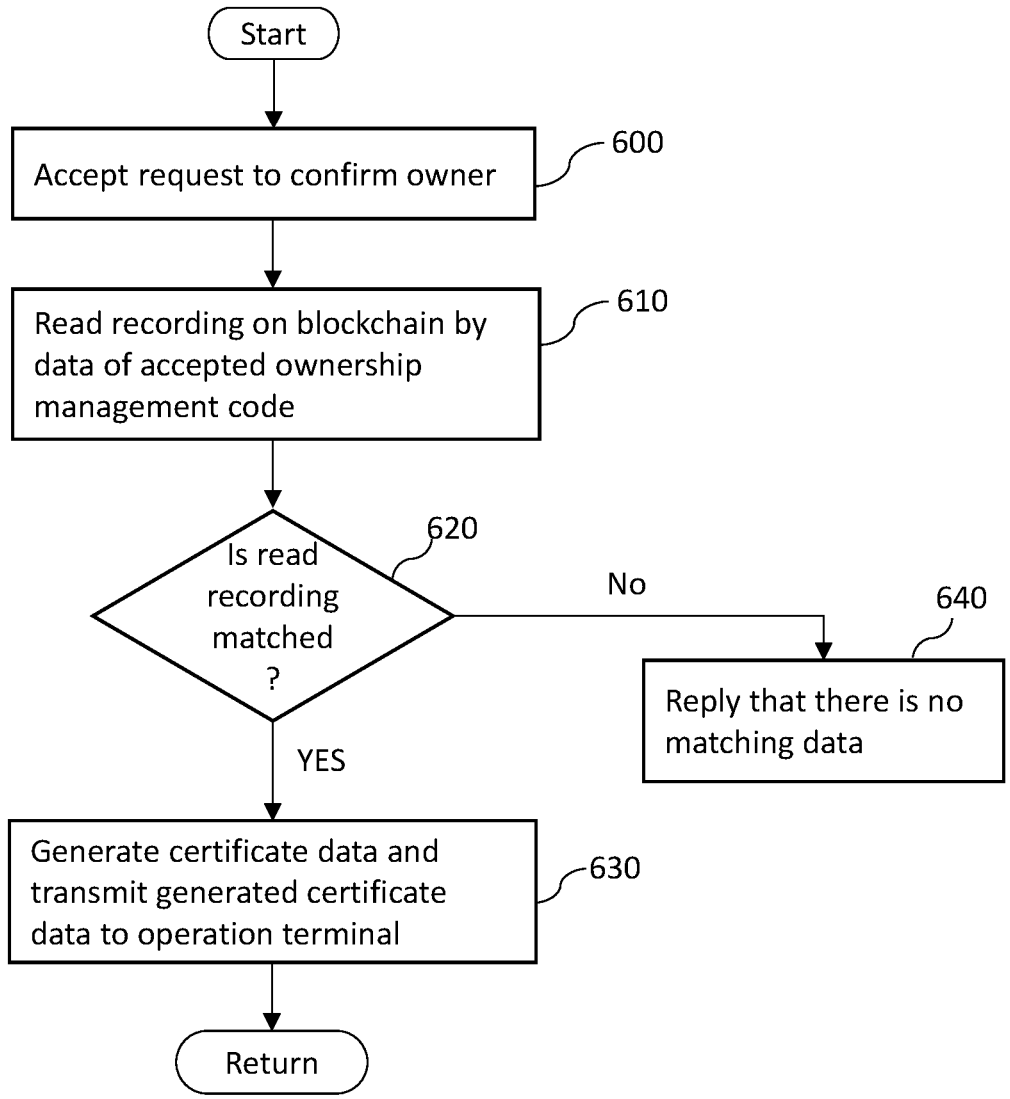
FIG. 6 is a flowchart illustrating the authenticity module, according to an embodiment of the present invention.

The transaction process as described in FIG. 5 may be incomplete until a verification by the purchaser can be obtained. Referring to FIG. 6 is a flowchart illustrating an exemplary embodiment of the authenticity module 1123. The authenticity module 1123 can receive an ownership request from the operation terminal 200, i.e., from the purchaser who is now a new owner or current owner or second owner of the article, at step 600. The ownership request can include the owner ID of the new owner and scanned information from the QR code in the certificate obtained by the new owner from the old owner. In one implementation, when the owner ID is generated by the article ownership management system 100, the ownership module 1121 can send the owner ID of the purchaser to the operation terminal 200 but not on the terminal device 300. Thus, the seller may not be aware of the owner ID of the purchaser. In case, the purchaser already has the owner ID, the same can be shared with the seller and the seller can provide the same to the ownership module 1121. In such a case, the sign-in by the purchaser using his owner ID can complete the verification step. Herein, the first owner is the seller of an article, and the second owner is a purchaser who purchases the article from the first owner. The authenticity module 1123 upon receiving the ownership request can match the information in the ownership request with the record saved by the ownership module 1121 in response to the owner change request. The match can be checked at step 620, and if the match could be verified, a new certificate in the name of the new owner can be generated and transmitted to operation terminal 200. Upon confirmation, the record can be stored in the blockchain as a block, and a new hash value of the block along with the owner ID of the new owner, and the article ID can be used to generate the new certificate and a NFT. Alternatively, the new record can already be stored in the blockchain as a block by the ownership module 1121, and the Authenticity module 1123 upon completion of the verification can issue the new certificate. In case, no match can be made at step 620, an error message can be displayed on the operation terminal 200. The Authenticity module 1123 allows the new owner of the article to confirm that he/she is a valid owner of the article. In addition, it is possible to indicate to a third party that the third party is a valid owner by a certificate issued by the system regarding the ownership of the third party.

The disclosed system can provide for the authenticity determination process of a registered article for verifying the authenticity of both the article and the present owner of the article, thus preventing both fake products and fraudulent transactions. The disclosed article ownership management system 100 can perform the authenticity determination process for the article together with the ownership management of the article. The authenticity determination process is also executed using the certificate, and the 2D code is issued to the owner of the article.

Figure 7:
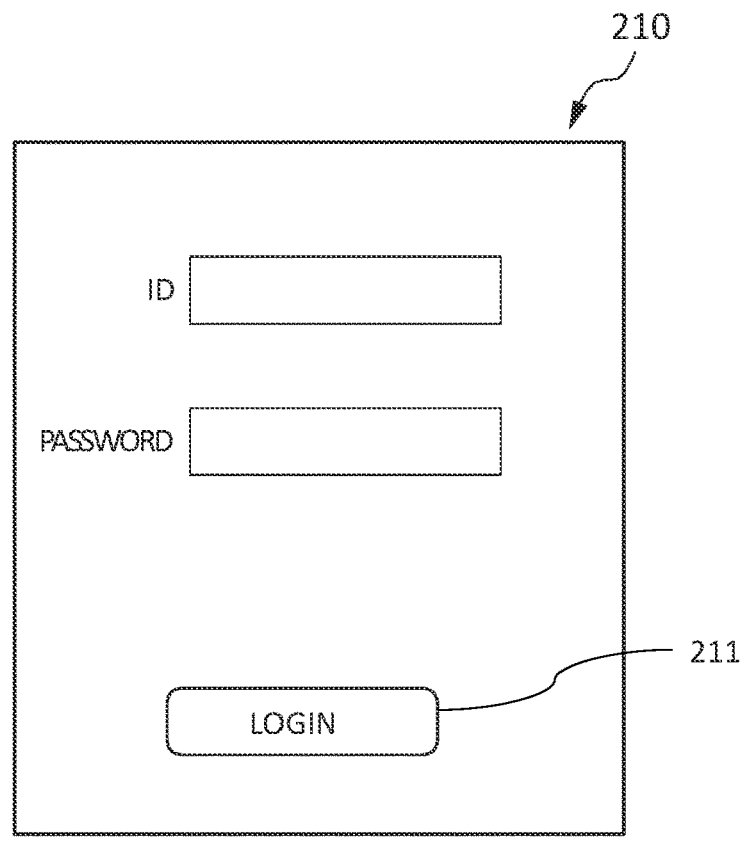
FIG. 7 is a login screen displayed on a user device, according to an embodiment of the present invention.

To use the authenticity determination service of the disclosed article ownership management system 100, a user on his user device can be provided an interface by the disclosed interface module 1124, wherein the interface can be provided as application software, through www as a webpage, and the like. The user can optionally register himself by providing basic contact detail, such as name and address, contact number, email id, and the like. A unique user ID and a password can be generated for the user for secured access to the article ownership management system 100. After registration, the interface module 1124, can present a login screen on the user device, as shown in FIG. 7. On the login screen 210, input fields of a user ID and a password registered in advance and a login button 211 are displayed. When the login button 211 is selected, the app transmits the input user ID and the password to article ownership management system 100. The article ownership management system 100 performs authentication using the user ID and the password and displays the user screen 220, shown in FIG. 8, through the interface presented on the user device.

Figure 8:
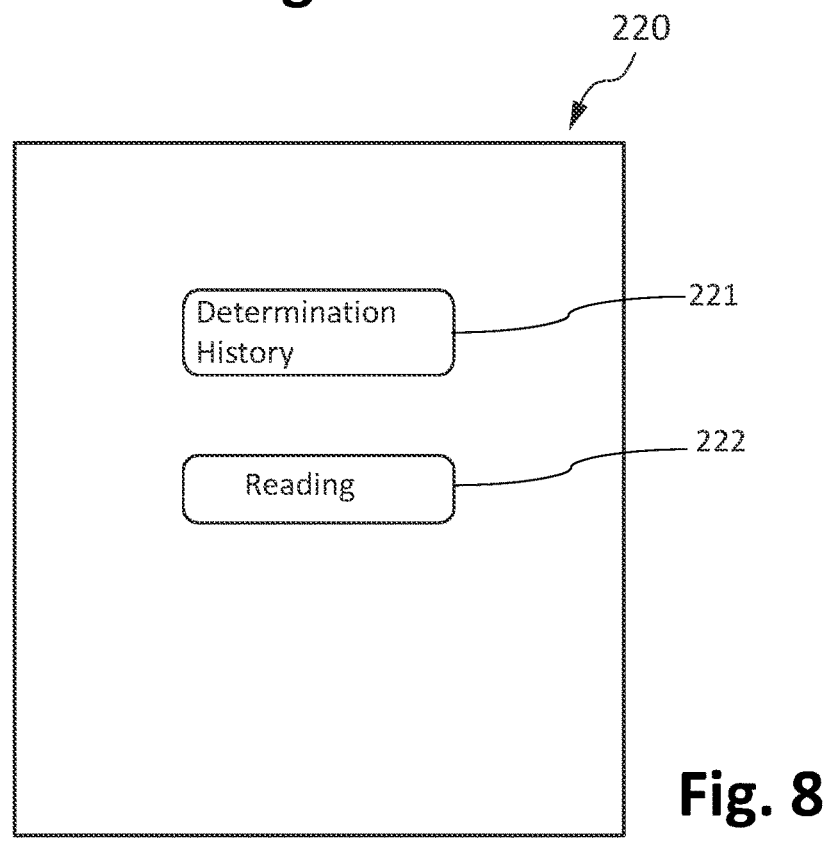
FIG. 8 is a user operation screen displayed on the user device, according to an embodiment of the present invention.
Figure 9:
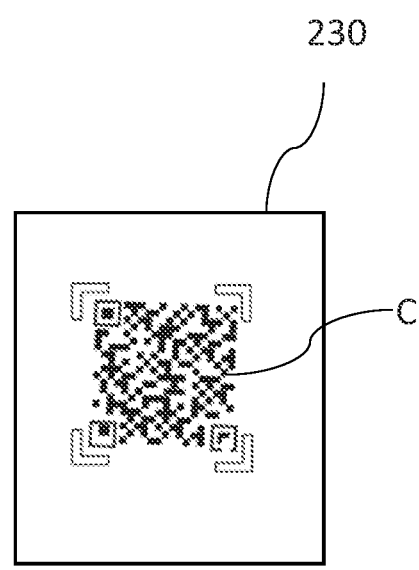
FIG. 9 is a reading screen displayed on the user device, according to an embodiment of the present invention.

As illustrated in FIG. 8, on the user screen 220, a determination history button 221 that can refer to the history of the authenticity determination performed by the user and a reading button 222 for starting to read the two-dimensional code are displayed. The history can be saved locally on the user's device. Alternatively, the history can be stored with the article ownership management system 100. Although not described in detail in the drawing, when the determination history button 221 is selected, the history of the authenticity determination can be viewed. When the reading button 222 is selected, a reading screen 230 as illustrated in FIG. 9 is displayed. The user reads a two-dimensional code C attached to the product at hand while displaying the reading screen 230.

Figure 10:
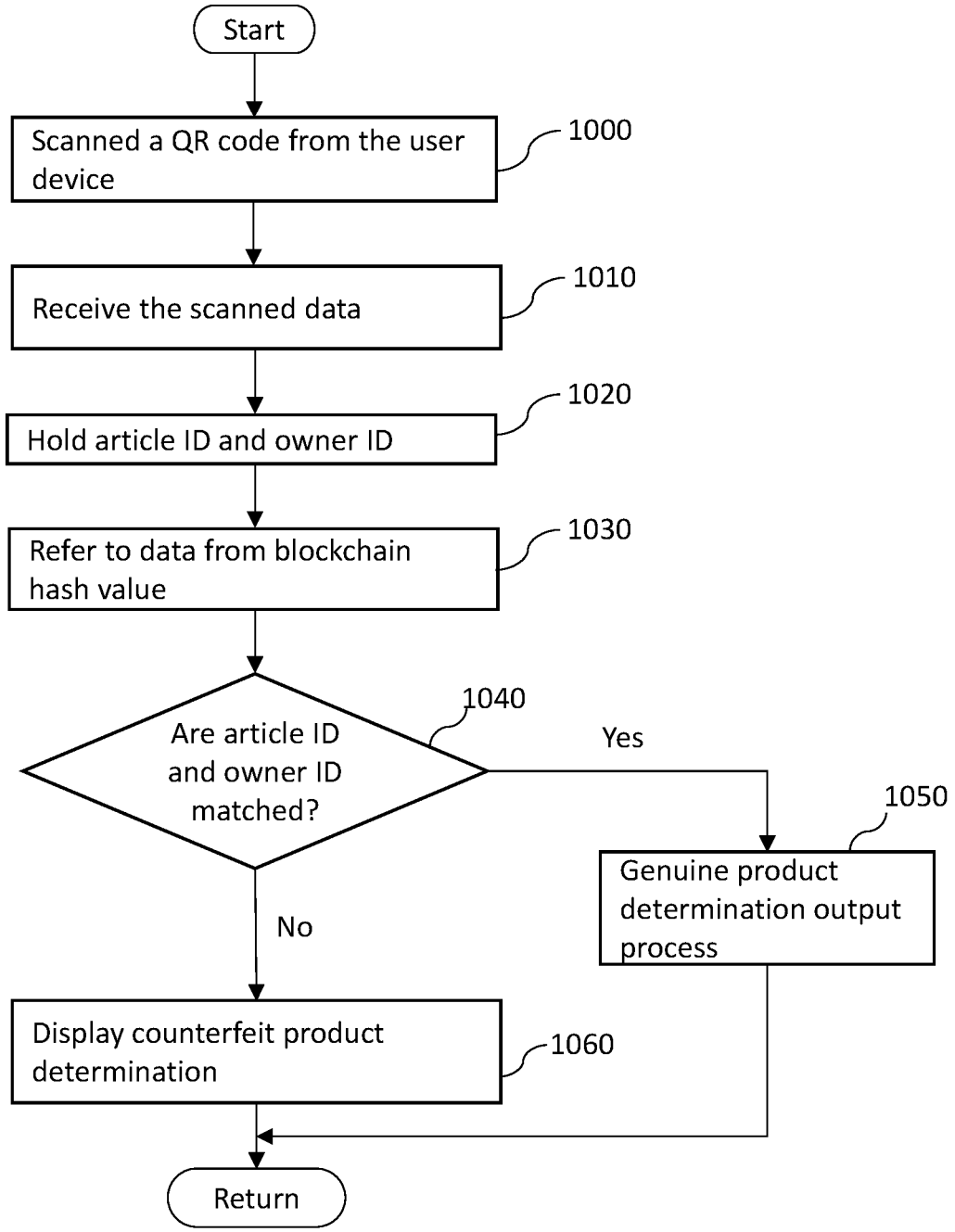
FIG. 10 is a flowchart illustrating an authenticity determination process, according to an embodiment of the present invention.

Referring to FIG. 10 which is a flowchart showing the authenticity determination process implemented by the authenticity module 1123. A user can scan the QR code C from the user device while being registered with the disclosed article ownership management system 100, at step 1000. The authentication module 1123 can receive the scanned data from the user device, at step 1010. The authenticity module 1123 can determine the hash value, article ID, and owner ID from the scanned data, and can store the information, at step 1020. The authenticity module 1123 can then fetch the related record from the blockchain using the value, at step 1030. A check can be made at step 1040 for the hash value, owner ID, and article ID. The authenticity module 1123 can collate the article ID and the owner ID from the user held at step 1020 and the article ID and the owner ID referenced from the blockchain hash value at step 1030, and determines a matching relationship therebetween. In case, the match is "yes" at step 1040, the article can be shown genuine by the authenticity module 1123, at step 1050. However, if the match cannot be made at step 1040, the authenticity module 1123 can display a message such that no relevant article could be found in the database or the product is counterfeit, at step 1060. Furthermore, in a case where the blockchain hash value cannot be obtained at step 1030, the authenticity module 1123 can display the message as in the step 1060. Moreover, in a case where it is determined that the article ID matches but the owner ID does not match, it may be configured to output "the owner ID does not match" as described later.

Figure 11:
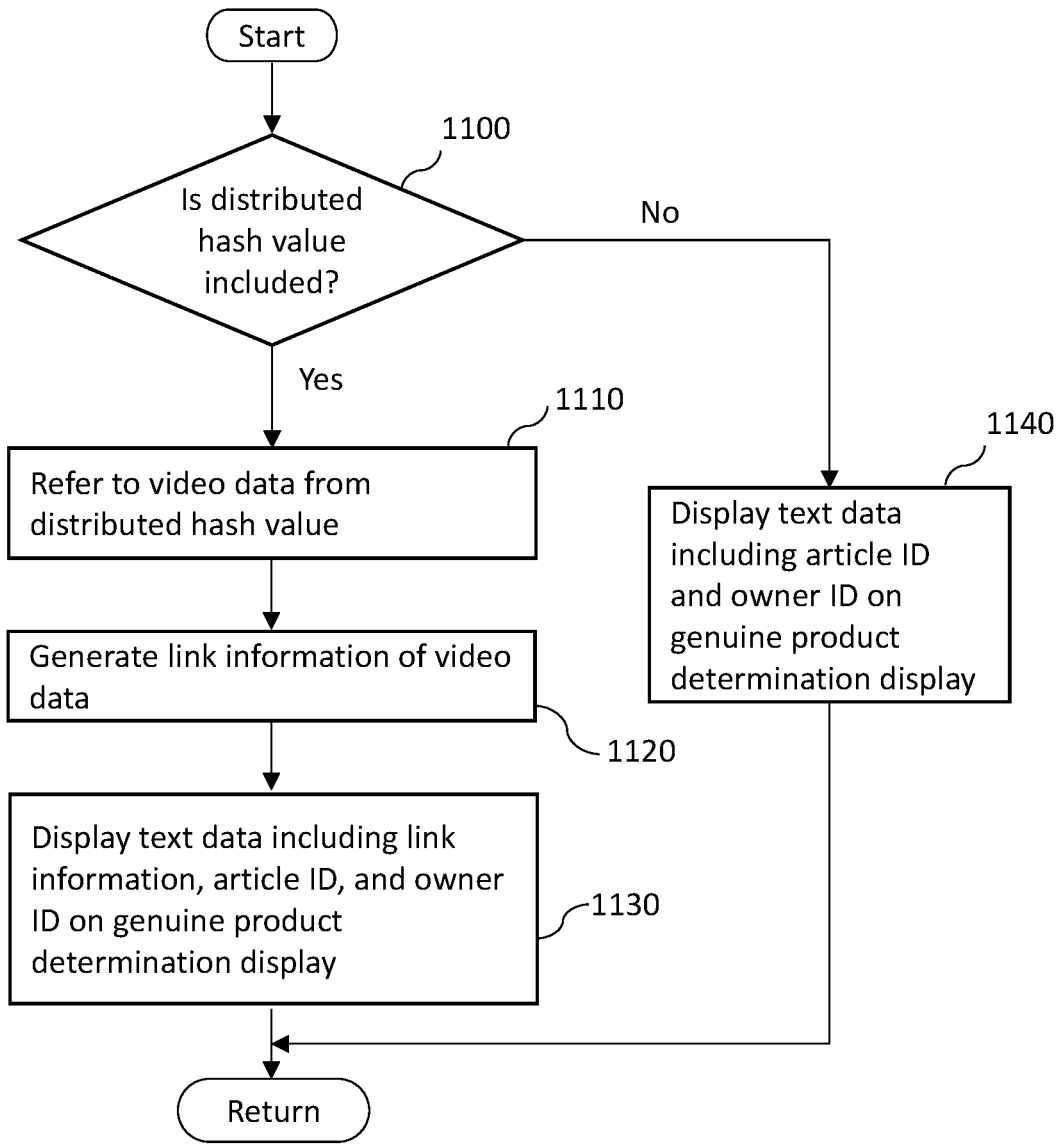
FIG. 11 is a flowchart illustrating a genuine product determination output process, according to an embodiment of the present invention.

Referring to FIG. 11 which is a flowchart illustrating a method to determine the authenticity of a registered article. The authenticity module 1123 can also check whether the obtained scanned data, at step 1030 of FIG. 10, includes a distributed hash value, at step 1100. If the distributed hash value can be found at step 1100, the authenticity module 1123 can refer to the video storage for retrieving details of the associated video data on the distributed file system, at step 1110. The authenticity module 1123 can then extract the referenced video data from the distributed hash value and convert the video data into a format in which streaming reproduction is possible, and then generates a link through which the video data can be streamed and reproduced, at step 1120. The authenticity module 1123 can present a screen showing the text data and link, including the information such as the article ID from the data referenced from the blockchain hash value on the genuine product determination display screen 240 on the user device, at step 1130 and complete the genuine product determination output process and the authenticity determination process. However, if no distributed hash value could be found at step 1100, the authenticity module 1123 can display a message including the article ID from the data on the blockchain referenced from the blockchain hash value on the genuine product determination display screen 240 in the app and completes the genuine product determination output process and the authenticity determination process.

Figure 12:
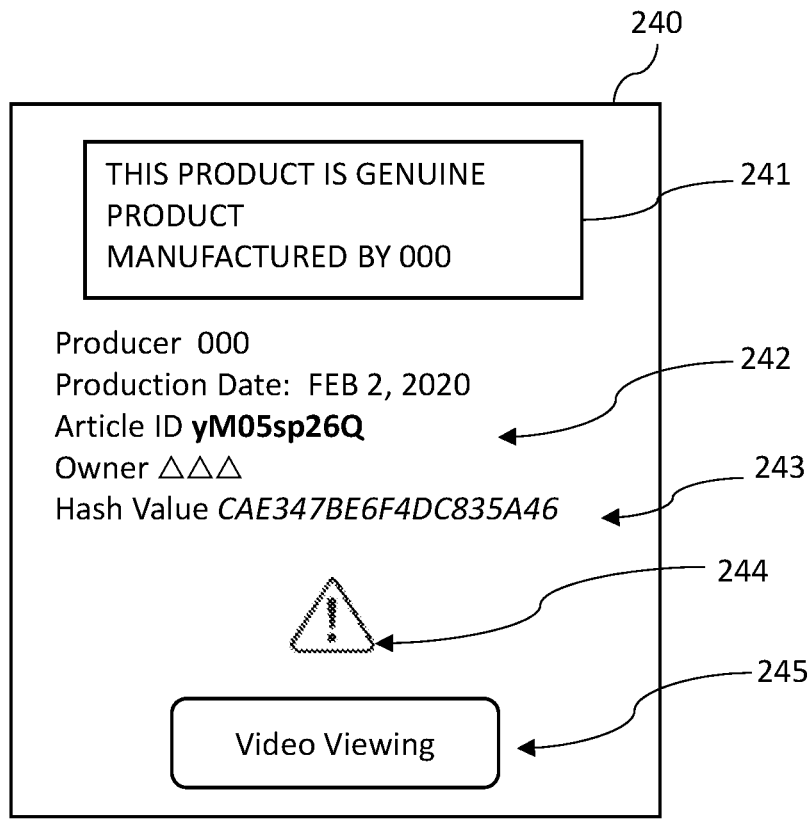
FIG. 12 is a genuine product determination screen displayed through the interface, according to an embodiment of the present invention.

Referring to FIG. 12 which illustrates the genuine product determination display screen 240 displayed as a result of the authenticity determination process. As illustrated in FIG. 12, the genuine product determination display screen 240 displays a message 241 for describing that the product is a genuine product, a producer name, a production date, an article ID 242, an owner name, a blockchain hash value 243, and a video viewing button 245 of video.

Since the genuine product determination display word 241 is displayed because of the authenticity determination, the user can confirm that the product to which the read two-dimensional code is attached is a genuine product. In recent years, mail-order sales such as Internet shopping have been widely established, and there are many shops where products can be purchased, some retailers omit the determination of authenticity or intentionally sell counterfeit products, being able to determine authenticity by consumers themselves, in this way can be expected to increase the reliability of products and increase consumers' purchasing motivation in mail-order sales which will be widely used in the future. Note that the display items and display forms of the genuine product determination display screen 240 may be appropriately changed according to the system specifications and the like without being restricted by the example of FIG. 12.

Figure 13:
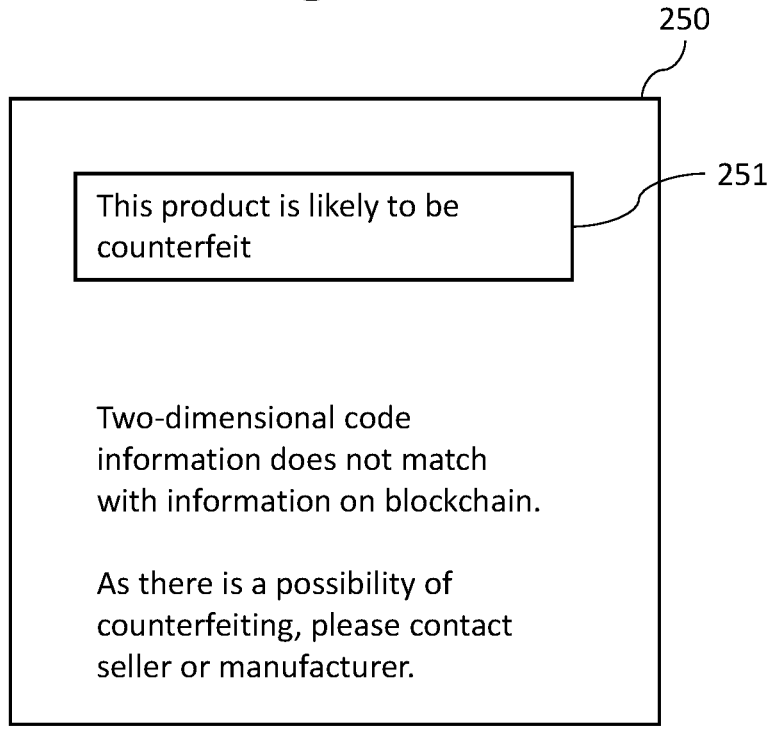
FIG. 13 is a counterfeit product determination screen displayed through the interface, according to an embodiment of the present invention.

Furthermore, in addition to the wording 241 describing that the product is genuine, the producer's name, the production date, the article ID 242, and the blockchain hash value 243 are displayed on the genuine product determination display screen 240, and as a result, it is possible to obtain a sense of trust from the determination that the product is a genuine product. By displaying the blockchain hash value 243 on the genuine product determination display screen 240, it can be seen that the data used for the determination is recorded on the blockchain capable of strongly suppressing falsification, and a sense of reliability can be added to the determination that the product is a genuine product. Furthermore, since the video viewing button 245 of the video displayed only in the case of the genuine product can be selected and the video can be viewed, it is possible to obtain a sense of reliability in the determination that the product is the genuine product, and in addition, it is possible to know the feeling or concept that the manufacturer wants to convey about the product as a story, and it is possible to satisfy the desire of possession of only the genuine product. In case, no good match can be made at step 1140 in FIG. 10, a screen as shown in FIG. 13 can be presented on the user device. A message block 251 can indicate that the product can be counterfeit. Additional information can also be presented on the screen.

In certain implementations, the person who has fraudulently acquired only the article to be managed does not have the article ID of the article and the two-dimensional code for acquiring the owner ID, and thus cannot indicate that the person himself/herself is the owner. Therefore, since the article cannot be resold to another person, fraudulent acts impersonating the owner are suppressed. In addition, even if the registered article and the two-dimensional code associated with the registered article are acquired together fraudulently when an unauthorized acquirer logs in to the disclosed system, the unauthorized acquirer performs based on the user information different from the valid owner, and thus, the owner confirmation request for the article cannot be made with the disclosed system. In this case, a second owner i.e., the purchaser who bought the article from the manufacturer, if wishes to resell the product, must register with the disclosed system at the time of obtaining the certificate.

The login credentials of the second owner who is now a reseller can be used to transfer the ownership to a third person using the steps described in FIG. 5. Therefore, also, in this case, the unauthorized acquirer is prevented from reselling the article.

In addition, when a case is assumed in which counterfeit products of articles to be managed are produced and unreasonably sold, it is not possible to prove the ownership of the counterfeit products only by producing the counterfeit products, and thus unauthorized sales are suppressed. In addition, in a case where the two-dimensional code corresponding to the authentic article is duplicated illegally when a person who acquires the counterfeit product tries to change the owner using the disclosed system, since he/she will be logged in based on user information different from the authentic product owner, the owner confirmation request for the relevant articles cannot be made with the disclosed system. Therefore, in this case, as well, an act of trying to obtain an unjust profit from a counterfeit product is suppressed. Furthermore, it is assumed that a person who has produced a counterfeit product has also obtained the login credentials of the current owner of the registered article, in addition to the two-dimensional code corresponding to the registered article. In this case, since the owner of the counterfeit product possesses the two-dimensional code for the authentic product and the system user information of the owner of the authentic product, formally, it is possible for the counterfeit product owner to impersonate the authentic product owner and resell the counterfeit product to another person in good faith, and to unfairly rewrite the owner's record in the disclosed system. However, in this case, the authentic product is possessed by the original authentic product owner, and when the authentic product owner requests the owner confirmation from the disclosed system using its own two-dimensional code, it becomes clear that the owner is unreasonably changed to another person even though the owner owns the authentic product. Therefore, it is considered a sufficient deterrent acts to plan fraudulent acts such as counterfeit product production and sales by affecting the risk that fraudulent sales of counterfeit products will be revealed later.

Note that, by adopting a two-factor authentication method to which short message service (SMS) authentication or the like is added for the login processing to the disclosed system, the third party cannot log in to the disclosed system unless the third party obtains not only the user information such as the login ID of the owner but also the operation terminal 200 such as the smartphone used by the owner. In this way, the resistance of the disclosed system to fraudulent acts can be improved. Other factors for authentication, such as biometric authentication, can also be incorporated without departing from the scope of the present invention, The disclosed system can record a browsing history for each piece of link information capable of streaming reproduction of the generated video data.

Specifically, the terminal information such as an IP address or a MAC address of a terminal that has accessed link information, that is, viewed the video is recorded together with date and time, and the number of times of access to similar link information, that is, the number of times of viewing is counted. The browsing history information is uploaded and recorded on the blockchain. Therefore, the falsification of the information of the browsing history can be prevented.

In addition, in addition to the record of the browsing history, the history of the authenticity determination request may be recorded and managed for each article ID which is the article identification information, or for each same article and for each user ID.

The video data can be used to further ensure the authenticity of the article, wherein the video data may include details that make the article-specific or premium. In certain implementations, when the number of times browsing the video exceeds a preset number of times, the disclosed system can display a warning 244 (see FIG. 12) indicating that the number of times browsing is large on the genuine product determination display screen 240. According to this, when the number of times browsing is larger than the set number of times, the ownership management identification code (QR code on the certificate) itself is duplicated, and there is a possibility that a request for authenticity determination has been made from the plurality of operation terminals 200. Therefore, there is an effect that the consumer who sees the warning display is urged to take action of confirming whether or not the product is a genuine product by inquiring about the store, the producer, or the manufacturer.

In addition, the disclosed system can record the browsing history for each link information with which the generated video data can be streamed and reproduced, record the browsing history in the link information for each user ID, and monitor the user ID who requests the authenticity determination at an unnatural number of times. Furthermore, the disclosed system can record a browsing history for each article ID, and monitors the article ID for which the authenticity determination has been requested an unnatural number of times so that it is possible to doubt the duplication of the ownership management identification code encoded with the article ID. Furthermore, when the link information enabling streaming reproduction of video data is browsed, the disclosed system can also obtain geographical position coordinates for the requesting user device in addition to date and time information from the operation terminal 200 that performs browsing and records the date and time information and the position information in the information of the browsing history. According to this, in any of the same link information, the same user ID, and the same article ID, in a case where the dates and times of a plurality of browsing histories are the same or close to each other, it is suspected of being involved with a counterfeit product. In addition to a case where the involvement of the counterfeit product is suggested when the position information of the plurality of browsing histories is densely located at the same position or close to each other in an unnatural number, it is possible to grasp the involvement of the counterfeit product in more detail by combining the date and time information and the position information. Note that, in a factory of a producer of an article, a workshop of a manufacturer, or the like, browsing may be performed a plurality of times for a test, and thus, it is preferable to exclude the number of times of browsing in such a specific location from a determination condition suspected of a counterfeit product by using the position information. In brief, the disclosed system can keep a record of activities with details of sources of the activity, time, and place of activities to detect any suspicious activity. For example, entering incorrect login credentials multiple times can indicate suspicious activity. Login into the disclosed system from multiple accounts but from the same location can indicate suspicious activity, and the disclosed system can take predefined steps when such suspicious activity is detected. The predefined steps can include sending notifications to the registered terminal devices and operation terminals.

In addition, the disclosed system may accept transaction information for buying and selling products, and the like, record each piece of transaction information on the blockchain for each article ID, and perform browsing as necessary based on the article ID restored from the ownership management identification code. According to this, traceability can be enhanced.

The disclosed system can record the article ID corresponding to the accepted link information in the call attention list, and thereafter, in a case where the accepted article ID is recorded in the call attention list along with the request for authenticity determination, a warning display is displayed on the genuine product determination display screen 240 of the operation terminal 200 which is a transmission source of the information of the ownership management identification code corresponding to the article ID. According to this, it is possible to promptly warn the consumer that the ownership management identification code itself is suspected of being duplicated.

To summarize the configuration of the disclosed system according to the present embodiment described above, the disclosed system generates an ownership management identification code (certificate, NFT) from an article ID that is unique identification information given by a product manufacturer to identify a product, an owner ID that is information for specifying an owner of the article, and a hash value acquired when the article ID is recorded on the blockchain. The producer and manufacturer of the article can add the generated ownership management identification code to the article and sell the article. The purchaser of the article can read the ownership management identification code attached to the article using the operation terminal 200 such as a smartphone and request the disclosed system to confirm the owner and determine the authenticity. The disclosed system is configured to restore the blockchain hash value, the article ID, and the associated owner ID from the information of the ownership management identification code accepted from the operation terminal 200, acquire the article ID and the owner ID recorded on the blockchain using the restored blockchain hash value, determine a matching relationship between the article ID and the owner ID directly restored from the ownership management identification code, and output the determined matching relationship to the operation terminal 200. According to this, the purchaser of the article can easily confirm the owner and determine the authenticity only by installing the app on the operation terminal 200 and reading the ownership management identification code attached to the article. In addition, since the article ID attached to the article and the owner ID associated with the article ID are associated with the blockchain hash value that is a recording destination of the identification information only with the identification code for ownership management, there is no possibility that the information used for the owner confirmation and the authenticity determination of the article is falsified, and the owner confirmation and the authenticity determination can be performed with high reliability.

In addition, since the disclosed system outputs the video data stored together with the article ID to the operation terminal in a viewable manner in a case where it is determined by the authenticity determination process that the two article IDs are matched, that is, in a case where it is determined that the article is a genuine product, the consumer selects a video viewing button of the video that is displayed only when the article is a genuine product and can view the video, and as a result, it is possible to obtain reliability in the determination that the article is a genuine product by viewing the video.

In addition, the disclosed system is configured to store the video data in the distributed file system and record the distributed hash value, which is data related to the storage of the video data, the article ID, and the owner ID as the node of the blockchain in association with each other, and since for the relationship between these video data and the article ID, the correspondence is recorded only on the blockchain, the disclosed system can prevent the falsification with this correspondence and prevent malicious video data from being replaced.

In addition, since the disclosed system uses the article identification information used for the ownership management and the authenticity determination as the article ID assigned at the time of production and manufacturing of the article, the disclosed system does not need to prepare and manage new identification information used for the ownership management and the authenticity determination and the correspondence relationship between the new identification information and the article ID, and is not exposed to the risk of malicious falsification. In other words, it is possible to maintain the reliability of the owner confirmation and the authenticity determination by performing the ownership management and the authenticity determination using the unique article ID already attached to the article.

In addition, the blockchain hash value in the ownership management identification code, the article ID, and the owner ID can be restored only by the disclosed system and are not visually recognized unless the genuine product is determined.

Therefore, even in a case where the proper ownership management identification code is simply duplicated, it is difficult to match the article ID and the owner ID attached to the article, and it is possible to effectively prevent the malicious ownership management identification code from being counterfeited.

Furthermore, in the present embodiment, the disclosed system encodes the blockchain hash value returned from the blockchain, the article ID, and the owner ID to generate the ownership management identification code. However, it is sufficient to generate the ownership management identification code based on the blockchain hash value, the article ID, and the owner ID, and a method other than encoding may be used.

In addition, since the disclosed system accepts the user ID from the operation terminal 200 when accepting the request for authenticity determination and records and manages the history of the authenticity determination for each user ID, the management company easily detects fraud. For example, in a case where the number of requests for authenticity determination is extremely large, it can be suspected that the user is involved in selling a counterfeit product, and it is possible to call attention to a producer and a manufacturer of a type of articles for which authenticity determination is requested from the user ID. Furthermore, the falsification can be prevented by recording the history of authenticity determination on the blockchain. Note that the data processing by the disclosed system described above may be executed by another part of the disclosed system.

As described above, according to an embodiment of the present invention, it is possible to provide an article ownership management system and an ownership management identification code that enable proper management of ownership of an article in the real world.

In a case where the owner of the article is changed, the disclosed system that has accepted the changed owner ID can be configured to record the article ID related to the article and the changed owner ID on the blockchain in association with each other, and generate the two-dimensional code as the ownership management identification code from the blockchain hash value acquired from the blockchain at the time of recording, the article ID, and the owner ID information.

In this way, since the change of the owner of the article is recorded on the blockchain in a form in which falsification is practically impossible, it is possible to effectively suppress fraudulent acts such as the fraudulent acquisition of the article and resale by impersonating the owner.

The article ownership management system may further include a video processing module configured to store video data corresponding to an article related to the article ID in the distributed file system in association with at least one of the blockchain hash values acquired from the blockchain at the time of recording and the article ID, and record link data related to storage of the video data and the article ID on the blockchain in association with each other, in which, when it is determined by the authenticity module that the matching is made, the operation terminal 200 can be configured to output the video data corresponding to the article related to the article ID so as to be viewable based on at least one of the blockchain hash value and the article ID extracted from the two-dimensional code.

In this way, since the video related to the article can be viewed only in a case where the article is a genuine product, it is possible to obtain a sense of reliability in the determination that the article is the genuine product, and in addition, it is possible to know what the producer and the manufacturer want to tell about the article and the concept as a story, and it is possible to satisfy the desire of possession of only the genuine product.

The operation terminal 200 can be configured to output the extracted blockchain hash value together with the matching relationship when the authenticity module determines matching. In this way, by displaying the blockchain hash value on the genuine product determination display, it can be seen that the data used for the determination is recorded on the blockchain capable of strongly suppressing falsification, and it is possible to give the reliability in the determination that the product is a genuine product.

In performing the determination process by the authenticity module, the history of determination can be configured to be recorded and managed for each of the article IDs. In this way, it is possible to extract an event suspected of some fraud, such as a case where determination requests are made a plurality of times for the same article ID.

Although the present invention has been described with reference to the drawings in accordance with the embodiments, the specific configuration is not limited to these embodiments, and modifications and additions within the scope not departing from the gist of the present invention are also included in the present invention. For example, in the above embodiment, a purchaser or a seller of the article performs the owner confirmation and the authenticity determination request using the app installed in the operation terminal 200. However, the present invention is not limited thereto, and for example, a function of executing a web application may be implemented in the disclosed system, and the reading screen of the ownership management identification code realized by the two-dimensional barcode or the like or the determination result may be displayed on the browser of the operation terminal 200. In addition, the disclosed system may include a correspondence table in which the distributed hash value returned when the accepted video data is stored in the distributed file system, the unique link information, and the article ID are associated with each other, record the unique link information and the article ID on the blockchain described above, and generate the ownership management identification code from the returned blockchain hash value and the article ID. Then, by allowing the distributed hash value in the correspondence table to be changed, even if the video data is changed, the correspondence relationship with the unique link information can be maintained, and the latest video can be viewed by the consumer.

In addition, the text data of various types of information including the article ID and the owner ID is not limited to be recorded on the blockchain of one type of platform, for example, the text data including the article ID and the owner ID may be recorded on the blockchain of the first platform, and the hash value returned from the blockchain of the first platform and other text data or the video data may be recorded on the blockchain of the second platform. In this way, it is possible to perform recording in an optimum combination according to the advantages and disadvantages of each platform.

The information output as a result of the authenticity determination is either the genuine product or the counterfeit product, but the present invention is not limited thereto, and for example, the reliability of the determination result may be scored and output. For example, in a case where the video is viewed more than the set number of times based on the number of times browsing of the video described above since there is a possibility that the ownership management identification code itself has been duplicated, when the authenticity determination is output, the reliability as the genuine product determination result may be reduced and output.

Furthermore, the blockchain in the above embodiment may be a public chain specification or maybe a so-called private chain that operates in an environment on a plurality of computers constituting the disclosed system. Further, the client-side operation terminal 200 used by a purchaser or a seller of an article is not limited to a smartphone and may be a tablet or a personal computer. In addition, the ownership management identification code used for the ownership management and the authenticity determination is not limited to be encoded as a two-dimensional code as in the above embodiment and may be recorded in the RFID. In addition, the two-dimensional code may be attached by attaching a printed seal to an article, may be directly printed on an article, or may be engraved and engraved.

In addition, the browsing history and the authenticity determination history are not limited to be recorded on the blockchain and may be stored in storage included in the disclosed system.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for managing ownership of an article and transfer of the ownership of the article, the method implemented within a system comprising a processor and a memory, the method comprising the steps of:

receiving a request to register an article from a first owner of the article from a terminal device;
assigning a unique articleID to the article and a unique first ownerID to the first owner;
generating a first record comprising the articleID and the first ownerID;
processing the first record as a first block in a blockchain;
generating a first certificate comprising a hash value of the first block, the articleID, and the first ownerID; and
presenting the first certificate on the terminal device.

2. The method according to claim 1, wherein the method further comprises the steps of:
providing an interface on the terminal device for capturing a video data of the article using a camera coupled to the terminal device;
storing the video data on a file server, wherein the file server is configured to stream the video data; and
generating a distributed hash value of the video data, wherein the first record further comprises the distributed hash value.

3. The method according to claim 2, wherein the method further comprises the steps of:
generating a link to the video data, wherein the link is configured to provide an access to the video data for streaming the video data.

4. The method according to claim 1, wherein the hash value of the first block is represented in a graphical form, wherein the hash value of the first block is readable from the graphical form.

5. The method according to claim 3, wherein the method further comprises the steps of:
receiving an owner change request from the first owner through the terminal device, the owner change request comprises the hash value of the first block;
assigning a second ownerID to a second owner of the article;
generating a second record comprising the second ownerID and the articleID, wherein the second record is linked with the first record;
receiving the hash value of the first block through an interface provided on an operation terminal and a camera coupled to the operation terminal;
upon receiving the hash value of the first block from the operation terminal, verifying the first record based on the hash value of the first block obtained from the operation terminal; and
upon verification, storing the second record as a second block in the blockchain; and
presenting a second certificate, generated from the hash value of the second block, the second ownerID, and the articleID, on the terminal device.

6. The method according to claim 1, wherein the method further comprises the step of:
generating a non-fungible token based on the first block.

7. The method according to claim 5, wherein the method further comprises the steps of:
receiving login credentials of the second owner through the operation terminal, wherein the verification is further based on the login credentials of the second owner, wherein the second ownerID is associated with the login credentials of the second owner.

8. The method according to claim 7, wherein the method further comprises a step of:
presenting a screen on the operation terminal, wherein the screen comprises the link to the video data.

9. The method according to claim 4, wherein the graphical form is a barcode or a QR code.

10. A system for managing ownership of an article and transfer of the ownership of the article, the system comprising a processor and a memory, the system configured to implement a method comprising the steps of:
receiving a request to register an article from a first owner of the article from a terminal device;
assigning a unique articleID to the article and a unique first ownerID to the first owner;
generating a first record comprising the articleID and the first ownerID;
processing the first record as a first block in a blockchain;
generating a first certificate comprising a hash value of the first block, the articleID, and the first ownerID; and
presenting the first certificate on the terminal device.

11. The system according to claim 10, wherein the system is further configured to implement the steps of:
providing an interface on the terminal device for capturing a video data of the article using a camera coupled to the terminal device;
storing the video data on a file server, wherein the file server is configured to stream the video data; and
generating a distributed hash value of the video data, wherein the first record further comprises the distributed hash value.

12. The system according to claim 11, wherein the system is further configured to implement the steps of:
generating a link to the video data, wherein the link is configured to provide an access to the video data for streaming the video data.

13. The system according to claim 10, wherein the hash value of the first block is represented in a graphical form, wherein the hash value of the first block is readable from the graphical form.

14. The system according to claim 12, wherein the system is further configured to implement the steps of:
receiving an owner change request from the first owner through the terminal device, the owner change request comprises the hash value of the first block;
assigning a second ownerID to a second owner of the article;
generating a second record comprising the second ownerID and the articleID, wherein the second record is linked with the first record;
receiving the hash value of the first block through an interface provided on an operation terminal and a camera coupled to the operation terminal;
upon receiving the hash value of the first block from the operation terminal, verifying the first record based on the hash value of the first block obtained from the operation terminal; and
upon verification, storing the second record as a second block in the blockchain; and
presenting a second certificate, generated from the hash value of the second block, the second ownerID, and the articleID, on the terminal device.

15. The system according to claim 10, wherein the system is further configured to implement the steps of:
generating a non-fungible token based on the first block.

16. The system according to claim 14, wherein the system is further configured to implement the steps of:
receiving login credentials of the second owner through the operation terminal, wherein the verification is further based on the login credentials of the second owner, wherein the second ownerID is associated with the login credentials of the second owner.

17. The system according to claim 16, wherein the system is further configured to implement the steps of:

presenting a screen on the operation terminal, wherein the screen comprises the link to the video data.

18. The system according to claim 13, wherein the graphical form is a barcode or a QR code.

\* \* \* \* \*